United States Patent
Kau

[11] Patent Number: 6,131,068
[45] Date of Patent: Oct. 10, 2000

[54] ACCURACY OF AN INERTIAL MEASUREMENT UNIT

[75] Inventor: Shing Peter Kau, Seminole, Fla.

[73] Assignee: Honeywell International Inc., Morristown, N.J.

[21] Appl. No.: 09/385,764

[22] Filed: Aug. 30, 1999

[51] Int. Cl.[7] .............................. G06F 165/00; F41G 7/00
[52] U.S. Cl. ....................... 701/220; 244/165; 244/3.1; 244/3.2; 244/79; 244/80; 33/523; 33/321
[58] Field of Search ............................. 701/220; 244/165, 244/79, 80, 3.1, 3.2; 33/323, 321

[56] References Cited

U.S. PATENT DOCUMENTS

| | | | |
|---|---|---|---|
| 4,495,850 | 1/1985 | White | 89/1.8 |
| 5,184,304 | 2/1993 | Huddle | 701/220 |
| 5,331,578 | 7/1994 | Stieler | 702/93 |
| 5,442,560 | 8/1995 | Kau | 701/220 |

Primary Examiner—William A. Cuchlinski, Jr.
Assistant Examiner—Olga Hernandez
Attorney, Agent, or Firm—Robert E. Greenstien

[57] ABSTRACT

A missile guidance system employs a strap down inertial measurement unit with a separate accelerometer and star sensor that are moved for preflight accelerometer initialization. During flight, light is directed on the accelerometer and inertial measurement unit to produce on the star sensor images of the light source, the accelerometer and the inertial measurement unit. The location of these images, which manifest the acceleration and position of the inertial measurement unit relative to the vehicle, are used to improve the accuracy of the inertial measurement unit data for vehicle guidance.

4 Claims, 2 Drawing Sheets

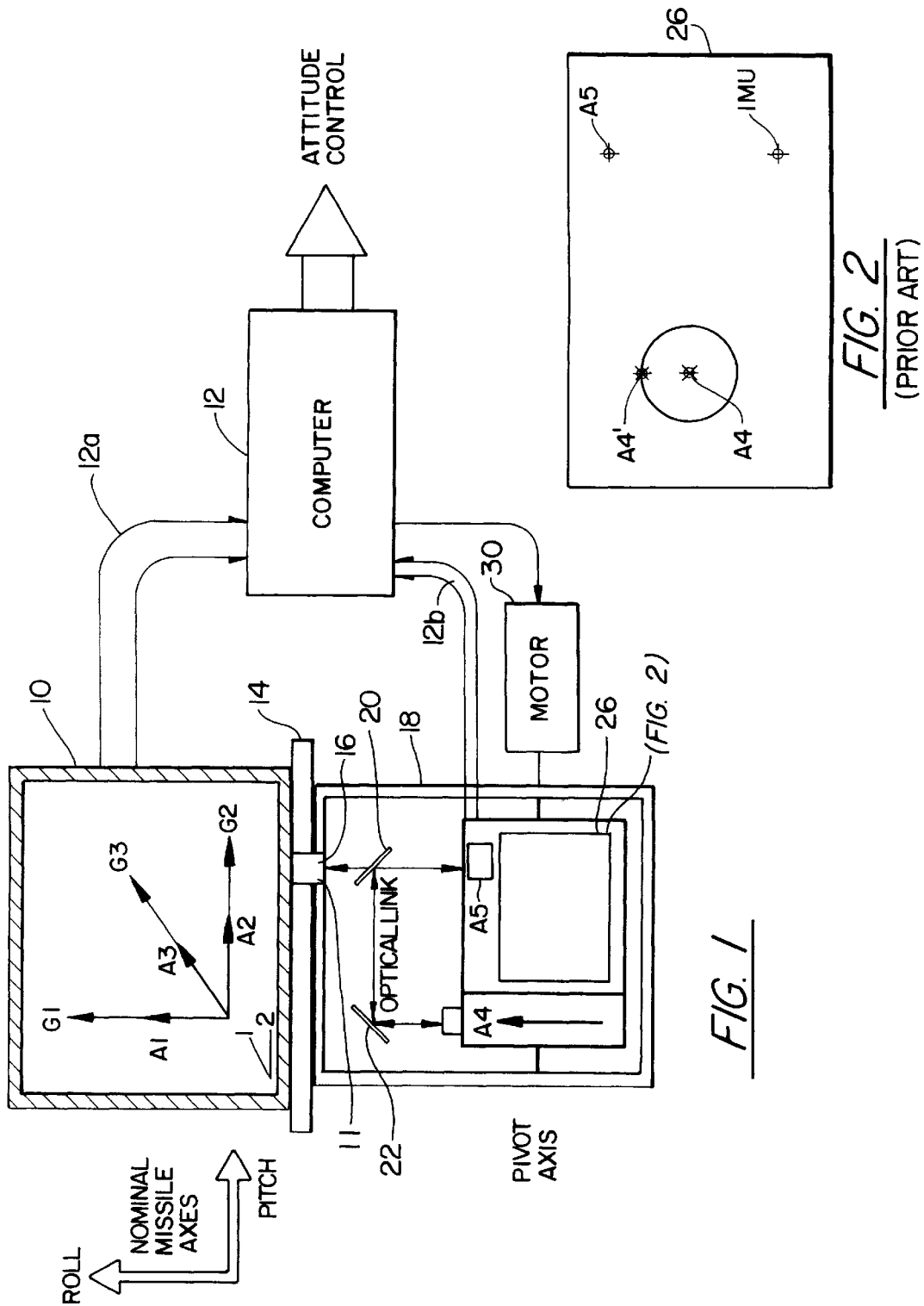

ACCURACY OF AN INERTIAL MEASUREMENT UNIT

FIELD OF THE INVENTION

This invention relates to inertial measurement units (IMU) and techniques for improving their accuracy in spacecraft and missiles.

BACKGROUND

My U.S. Pat. No. 5,442,560, granted on Aug. 15, 1993, titled "Integrated Guidance System and Method for Providing Guidance to a Projectile on a Trajectory" and incorporated by reference, considers the need for precise data representing the rotation and velocity of a missile in a missile guidance control or system. It shows a so-called "strap down" inertial measurement unit that is used as an element in missile guidance control using a computer that requires IMU initialization prior to vehicle movement. The patent explains an advancement that uses a core strap down IMU 13 containing accelerometers A1, A2, A3 and gyroscopes G1, G2, G3 that are not rotated for initialization, like the prior art. Instead, the core IMU is aided by a fourth accelerometer A4 and star sensor 31 that are rotated by a motor 51 to initialize a computer or signal processor 39 for calibration of the fourth accelerometer in the gravity field prior to launch of the projectile or "vehicle". The star sensor is used to help locate the missile orientation in space. The fourth accelerometer may be a PIGA (Pendulous Integrating Gyroscope Accelerometer) which may be accurately calibrated on the earth's gravity before launch. The fourth accelerometer aid the strap down core IMU for accuracy of the total system.

Regardless of whether the core IMU is strapped down all the time, as explained in the patent, or after launch, during a reentry mode the vehicle (e.g., projectile or missile) is subjected to substantial forces that induce vehicle structural changes that in turn produce changes in the IMU output, degrading the accuracy of vehicle guidance. That is, while the core IMU is locked in place, it may move as the vehicle is stressed, producing errors that degrade total system accuracy.

SUMMARY OF THE INVENTION

An object of the present invention is to reduce the effect of those errors.

According to the invention, a star sensor is used in conjunction with the IMU to detect the displacement of the IMU caused by the stresses and provide a correction to the inertial data with a computer. The star sensor senses the relative alignment of the IMU to a separate fourth accelerometer associated with the star finder or sensor.

According to the invention, a star sensor fixed light source is used as an artificial star and its light is reflected off the core IMU and the fourth accelerometer on to an optical surface where the relative positions (displacements) are measured and used by processor (i.e., signal processor, computer) that also receives the output from the core IMU to provide corrected acceleration and position data signals for eventual use in controlling the vehicle's attitude (pitch and yaw) and flight trajectory.

According to one aspect of the invention, the fourth accelerometer can be high accuracy PIGA (Pendulous Integrating Gyroscope Accelerometer) containing an SDM (Servo Driven Motor) with a polished rim. The sensitive axis of the PIGA can be located directly by monitoring the image of the artificial star reflected from the polished rim of the SDM. This eliminates any misalignment between the PIGA sensitive axis and the case mounted optical surface which otherwise would be used.

Other objects, benefits and features of the invention will be apparent from the following discussion of one or more embodiments.

BRIEF DESCRIPTION OF THE DRAWINGS

FIG. 1 is a block diagram of a system embodying the present invention.

FIG. 2 shows the optical detector array in the star sensor.

DESCRIPTION OF THE PREFERRED EMBODIMENTS

Figure 3:
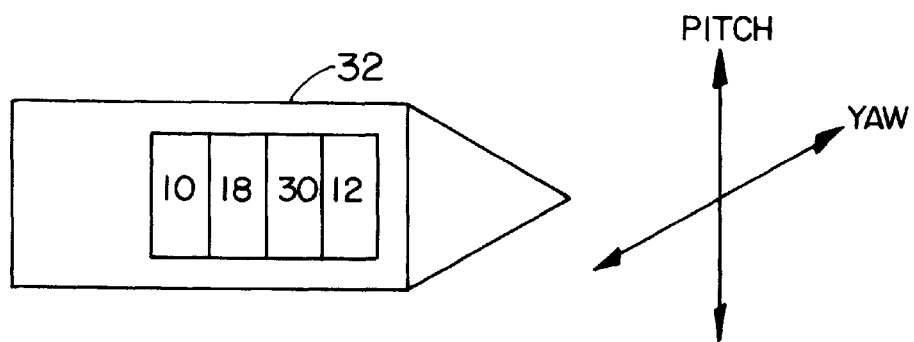
FIG. 3 shows a typical use of the invention in a missile.
Figure 4:
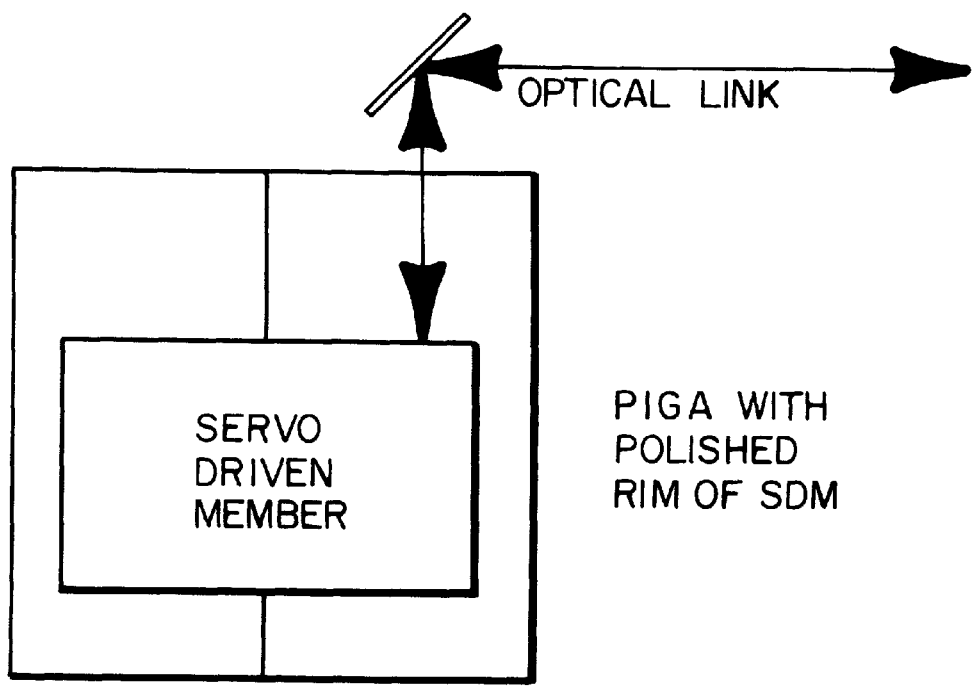
FIG. 4 is a block diagram of PIGA as used in the present invention.

In FIG. 1, a strap down IMU 10 contains accelerometers A1–A3 and gyros G1–G3, which are functionally shown by the vectors defining their respective sensitive axis. A computer 12 receives the IMU signals from the accelerometers A1–A3 and gyros G1–G3 over a line 12a and, as explained below, produces modified signals that are supplied to a missile guidance that controls the flight trajectory of the missile. The IMU 10 is mounted remotely from a star sensor 18 and the fourth accelerometer A4. An aperture 11 is located on the wall 14 that separates the two modules 10, 18. An optical cube 16, or any polished surface, is attached to the core IMU 10 and in the aperture 11 for optical representation of the sensitive axes A1–A3 and G1–G3. A light source or "artificial star" AS shines on a partially reflective mirror 20. Some of the light passes through the mirror 20 and to the aperture 11 and is reflected back from the optical cube 16 on the IMU 10. This image passes through the mirror 20 and is projected as the point IMU on an optical detector array 26, shown in FIG. 2. Light from the source AS appears on the detector as the point AS. Light reflected by the mirror 20 is reflected by another mirror 22 on accelerometer A4 and the image is reflected on the same mirror path and appears on the detector array 26 as image A4. The accelerometer A4 may be of the conventional type or may be a PIGA, in which case the image A4' would be of the PIGA's rotating reflective surface, but off center as a function of acceleration along the circular locus shown in FIG. 2. Since a PIGA is well known, the details of the device are not shown. It is sufficient to understand that image from the PIGA is projected on the detector array 26 and that its location relative to the other images AS and IMU is a function of the acceleration of the missile 18. In the same way, the location of the image IMU is a function of the physical movement in planar directions 1 and 2 of the optical cube 16, which represents the sensitive axes of the IMU 10 if a relative shift is induced by missile acceleration during flight.

A motor 30 is controlled by the computer to rotate the star sensor 18 and accelerometer A4 for preflight calibration, an operation explained in my previously identified patent. The IMU 10, star sensor 18, motor 30 and computer 12 are located in a missile 32 as shown in FIG. 3 as part of an guidance system, not shown but well known in the art.

The star sensor 18 provides to the computer 12 signals on the lines 12b that indicate the relative positions of the images A4, IMU and AS on the detector array 26. The computer uses those signals to provide a correction for the signals from the IMU so that the result of the movement in directions 1 and 2 is minimized, if not completely canceled. The following explains the signal processing routine used by the computer based on the LOS (line of sight) between the images on the detector array.

The relative positions of the images A4, IMU and AS determined during preflight are stored in the computer memory for reference purposes. The relative positions determined during flight are compared to the stored preflight references to detect a shift caused by vehicle acceleration. Accelerometer measurements from A1–A3 and A4 are corrected using the shifts that are detected during powered flight. After powered flight has ended, the vehicle will be in a relatively benign environment, where not appreciable shift is expected. The motor 30 will reorient the star sensor with it FOV (field of view) pointing outward in preparation for star sighting. A roll about the star sensor LOS (line of sight) during star sighting provides information to correct for misalignment between the core IMU 10 and the star sensor 18, as explained above.

With the benefit of the previous discussion of the invention, one of ordinary skill in art the may be able to modify the invention in whole or in part without departing from the true scope and spirit of the invention.

I claim:

1. A method for improving the accuracy of a strap down inertial measurement unit comprising a star sensor detector array and an accelerometer that can me moved relative to the strap down inertial measurement unit, characterized by:

directing light from a common light source to produce on the detector array images of the light source, the inertial measurement unit and the accelerometer;

producing a plurality of signals that indicate the relative positions of said images; and supplying said images to a signal processor to modify guidance signals produced from the inertial measurement unit.

2. A guidance system, characterized by:

an inertial measurement unit that is strapped down on a vehicle and comprises means for providing a plurality of signals manifesting vehicle rotational movement and acceleration in a plurality of axis;

a signal processor for receiving said plurality of signals to produce guidance control signals for the vehicle;

a star sensor on a platform on the vehicle, said star sensor comprising a detector array and said platform being moveable relative to said inertial measurement unit;

an accelerometer on said platform;

an optical cube attached to said inertial measurement unit to provide an image of said inertial measurement unit;

a light source on said platform;

a pair of mirrors on said platform, said mirrors oriented to direct light from said light source to the accelerometer and the optical cube and direct images of said light source, said accelerometer and said cube on said detector array, said detector array proving a plurality of position signals to said signal processor, said plurality of position signals representing the location of said images on the detector array and said light source; and said signal processor modifying said guidance control signals as a function of the differences in location of said images of the accelerometer and said cube on said detector array.

3. The guidance system described in claim 2, further characterized by:

said accelerometer comprising a PIGA.

4. The guidance system of claim 2, further characterized by:

a motor to move the platform prior to vehicle acceleration to initialize said accelerometer before vehicle flight.

* * * * *